(12) United States Patent
Williams

(10) Patent No.: US 11,525,975 B1
(45) Date of Patent: Dec. 13, 2022

(54) ACTIVE LINEAR FOCUS LENS ADJUSTMENT ASSEMBLY

(71) Applicant: Korvis, LLC, Corvallis, OR (US)

(72) Inventor: Phillip A. Williams, Albany, OR (US)

(73) Assignee: Korvis, LLC, Corvallis, OR (US)

( * ) Notice: Subject to any disclaimer, the term of this patent is extended or adjusted under 35 U.S.C. 154(b) by 258 days.

(21) Appl. No.: 16/889,038

(22) Filed: Jun. 1, 2020

Related U.S. Application Data

(60) Provisional application No. 62/854,348, filed on May 30, 2019.

(51) Int. Cl.
| | |
|---|---|
| *G02B 7/04* | (2021.01) |
| *G02B 26/10* | (2006.01) |
| *G02B 19/00* | (2006.01) |
| *B29C 64/268* | (2017.01) |
| *H02K 11/22* | (2016.01) |
| *H02K 41/035* | (2006.01) |
| *B33Y 30/00* | (2015.01) |

(52) U.S. Cl.
CPC .............. *G02B 7/04* (2013.01); *B29C 64/268* (2017.08); *B33Y 30/00* (2014.12); *G02B 19/0009* (2013.01); *G02B 19/0047* (2013.01); *G02B 26/105* (2013.01); *H02K 11/22* (2016.01); *H02K 41/0356* (2013.01)

(58) Field of Classification Search
CPC .. G02B 7/04; G02B 19/0009; G02B 19/0047; G02B 26/105; B29C 64/268; B33Y 30/00; H02K 11/22; H02K 41/0356
See application file for complete search history.

(56) References Cited

U.S. PATENT DOCUMENTS

| | | | |
|---|---|---|---|
| 6,885,116 B2 | 4/2005 | Knirck et al. | |
| 7,364,145 B2 | 4/2008 | Knirck et al. | |
| 9,052,511 B1 * | 6/2015 | Knirck | G02B 26/105 |
| 9,304,314 B1 | 4/2016 | Knirck | |

* cited by examiner

*Primary Examiner* — James C. Jones
(74) *Attorney, Agent, or Firm* — Gardner, Linn, Burkhart & Ondersma LLP

(57) ABSTRACT

A lens positional adjustment device having a lens mounted to a moveable lens body, with the lens body including a bearing member and the lens mounted to the body to enable a laser beam to be projectable at and through the lens. A first voice coil member is mounted to the lens body and is axially offset from the optical axis of the lens. The device also includes a housing having a second voice coil member and a housing bearing with the bearing member of the lens housing being engaged with the housing bearing. The voice coil members are constructed to be one of an electrical coil winding and a magnet that engage to enable movement of the lens body relative to the housing when a current is supplied to the electrical coil winding whereby movement of the lens body relative to the housing adjusts the position of the lens.

20 Claims, 9 Drawing Sheets

ACTIVE LINEAR FOCUS LENS ADJUSTMENT ASSEMBLY

CROSS REFERENCE TO RELATED APPLICATION

The present application claims priority of U.S. provisional application Ser. No. 62/854,348 filed May 30, 2019, which is hereby incorporated herein by reference in its entirety.

BACKGROUND OF THE INVENTION

The present invention is directed to a device for actively adjusting the linear orientation of an optical lens, and in particular an assembly for adjusting the linear orientation of a focus lens for a beam used in an additive manufacturing process.

Commercial additive manufacturing machines, such as large, commercial, 3D-printing processes, include a directional energy source system, such as a UV laser, and include a beam shaping and aiming system. A single beam is typically used to generate shapes onto a large, rectangular, horizontal surface located over, for example, a vat of photopolymer resin. The laser and aiming systems are usually located on top of the machine, above the work surface. The laser beam is directed to points on the work surface with a set of two mirrors mounted to two high-speed galvanometers operating in series. One galvanometer steers the beam in the X direction and the other in Y.

The geometry of this system dictates that the beam length from laser to target spot will be shortest at the center of the work area, longer away from the center point and longest in the four corners. As the beam path grows longer, the beam rays diverge and the spot size increases. Accordingly, for power and shape consistency, the spot size of the beam must be maintained at a uniform size.

SUMMARY OF THE INVENTION

The present invention provides a lens positional adjustment device for positioning the axial location of a focus lens in an additive manufacturing system.

In accordance with an aspect of the present invention, the lens positional adjustment device has a lens mounted to a moveable lens body, with the lens body including a bearing member and a passageway configured to enable a laser beam to be projectable at and through the lens. A first voice coil member is mounted to the lens body and is axially offset from the passageway of the lens body. The device also includes a housing having a second voice coil member and a housing bearing with the bearing member of the lens body being engaged with the housing bearing. The voice coil members are constructed to be one of an electrical coil winding and a magnet that engage to enable movement of the lens body relative to the housing when a current is supplied to the electrical coil winding whereby movement of the lens body relative to the housing adjusts the position of the lens.

In a particular embodiment the magnet is a cylindrical magnet having a cylindrical cavity within which the electrical coil winding is engaged, with the electrical coil winding being disposed on the lens body and the cylindrical magnet being mounted to the housing. Still further, a pair of linear bearings are mounted between the lens body and the housing, with the linear bearings extending axially relative to the direction of movement of the lens body. Still further, an encoder scale is disposed at the lens body and an encoder reader is disposed at the housing for monitoring the position of the lens body, and thereby the lens, via a control system.

In a further aspect of the invention, the housing includes an entrance aperture and an exit aperture with the lens being aligned with the entrance aperture and the exit aperture and the lens body configured for movement between the entrance aperture and the exit aperture.

An additive manufacturing system in accordance with an aspect of the invention includes a lens positional adjustment device in accordance with the present invention and includes a laser configured to project a laser beam at the lens positional adjustment device with the laser beam being projected at and through the lens. A pair of galvanometers having mirrors configured to receive the laser beam after passing through the lens. The additive manufacturing system further includes a work surface, with the galvanometers and lens positional adjustment device being operable to direct the laser beam from the laser at the work surface.

The lens positional adjustment device or assembly of the present invention accurately adjusts the position of a focus lens for controlling the laser beam size in order to optimize the spot size of the laser projecting on to a work surface for an additive manufacturing system. The lens positional adjustment device operates in concert with a printing program of an additive manufacturing system to anticipate the location of the laser beam on the work surface and move the focus lens accordingly to optimize the spot size. The lens positional adjustment device of the present invention is significantly more accurate and repeatable, with much less angular deviations in pitch, roll and yaw, than existing devices, which in turn improves the build quality of parts produced by the associated additive manufacturing system. These and other objects, advantages, purposes and features of this invention will become apparent upon review of the following specification in conjunction with the drawings.

DESCRIPTION OF THE PREFERRED EMBODIMENTS

Figure 1:
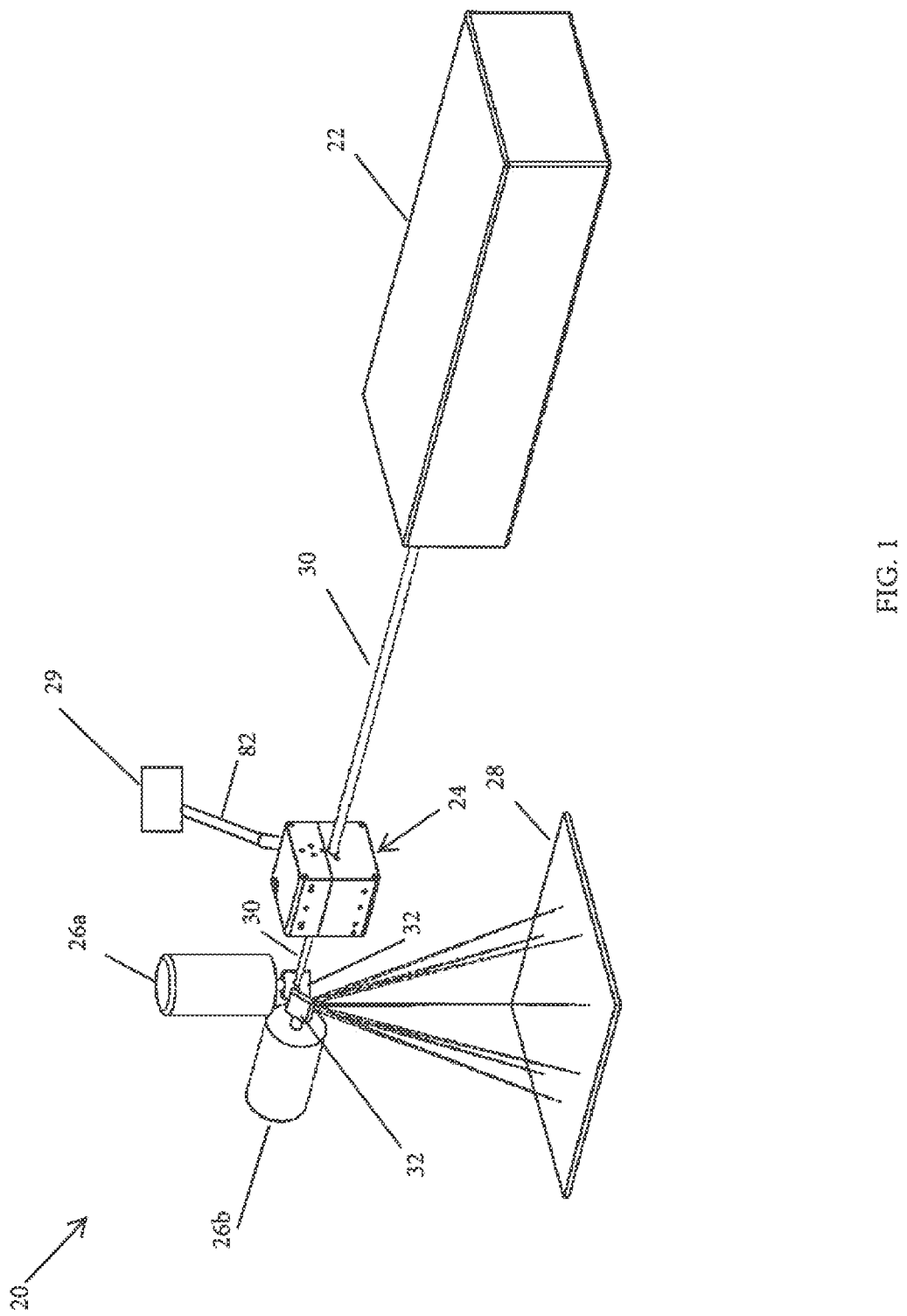
FIG. 1 is a perspective view of an additive manufacturing system configured as a 3D-printing system having a laser source directed at an active linear optical focus lens adjustment assembly in accordance with the present invention for providing a laser beam to beam steering galvanometers.
Figure 2:
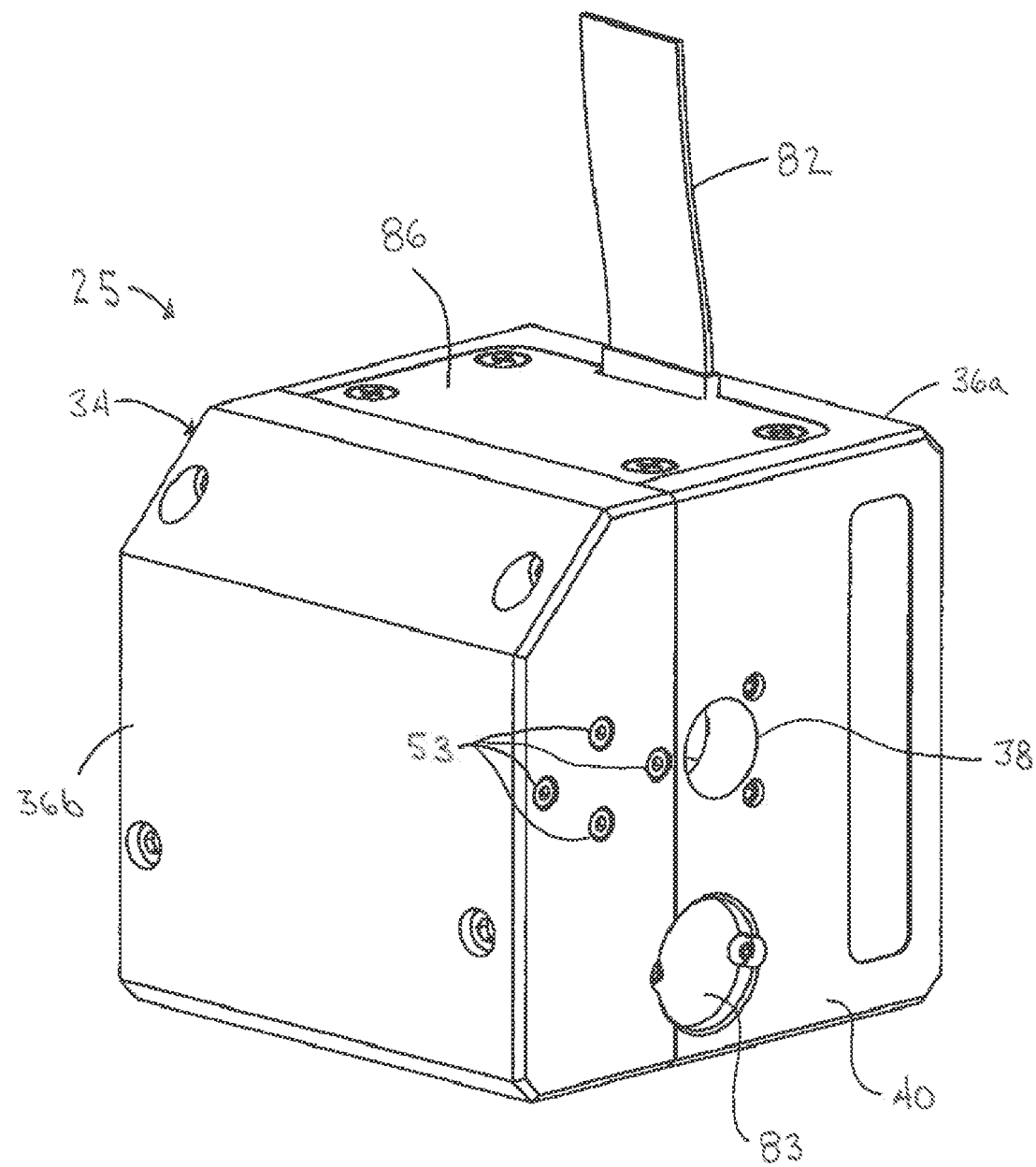
FIG. 2 is a perspective view of an active linear optical focus lens adjustment assembly shown apart from a 3D-printing system such as disclosed in FIG. 1.

The present invention will now be described with reference to the accompanying figures, wherein the numbered elements in the following written description correspond to like-numbered elements in the figures. An additive manufacturing system 20 configured as a 3D-printing system is disclosed in FIG. 1 to include an energy source configured as a laser 22, a linear axis focus lens adjustment assembly 24, a pair of galvanometers 26a, 26b and a work surface 28, along with a controller 29, such as a computer or processor, or the like, for operating system 20. In operation, laser 22 directs an energy beam such as laser beam 30 at and into focus lens adjustment assembly 24, with the laser beam 30 then exiting focus lens adjustment assembly 24 and being directed at galvanometers 26a, 26b. Galvanometers 26a, 26b in turn include mirrors 32 for steering the laser beam 30 at the work surface 28, with galvanometer 26a configured to steer the laser beam 30 in the X-direction and galvanometer 26b configured to steer the laser beam 30 in the Y-direction. As discussed below, the focus lens adjustment assembly 24 in accordance with the present invention operates to accurately adjust the position of a focus lens through which laser beam 30 passes for maintaining the spot size of the laser beam 30 on work surface 28 regardless of where the laser beam 30 is steered on work surface 28.

Referring now to FIGS. 2-6A, a focus lens adjustment assembly 25 that is configured and operates in substantially like manner to focus lens adjustment assembly 24 of FIG. 1 includes a housing or body 34 that in the illustrated embodiment includes a first portion 36a and a second portion 36b that are connected together by way of various fasteners when assembled. Housing 34 includes a laser beam entry aperture 38 on one side 40 into which a laser beam 30 is directed from a laser 22 when utilized in an additive manufacturing system 20. Correspondingly, housing 34 includes a laser beam exit aperture 42 on an opposite side 44, where apertures 38 and 42 are linearly aligned. As discussed in more detail below, a moveable carriage assembly 46 is retained within housing 34, with carriage assembly 46 supporting a focus lens 48 having a central optical axis 49 (FIG. 7), with laser beam 30 being directed at and through focus lens 48. Housing 34 comprises a stationary support member with focus lens 48 supported between apertures 38 and 42 whereby movement of focus lens 48 within housing 34 adjusts the laser beam 30 for controlling the spot size on work surface 28.

Figure 3:
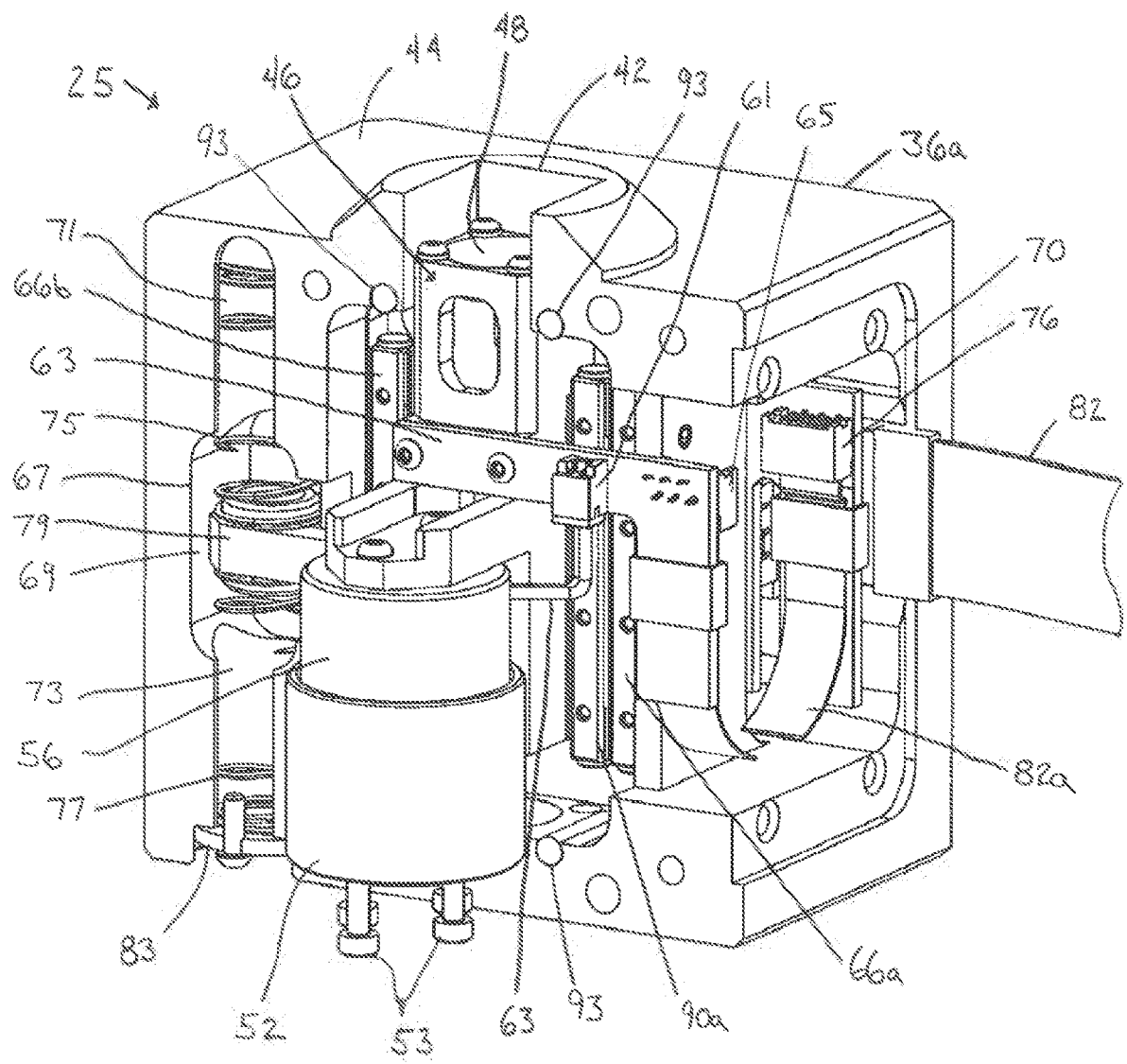
FIG. 3 is a partial perspective view of the focus lens adjustment assembly of FIG. 2 shown with a portion of the housing removed to disclose internal structure of the assembly.
Figure 4:
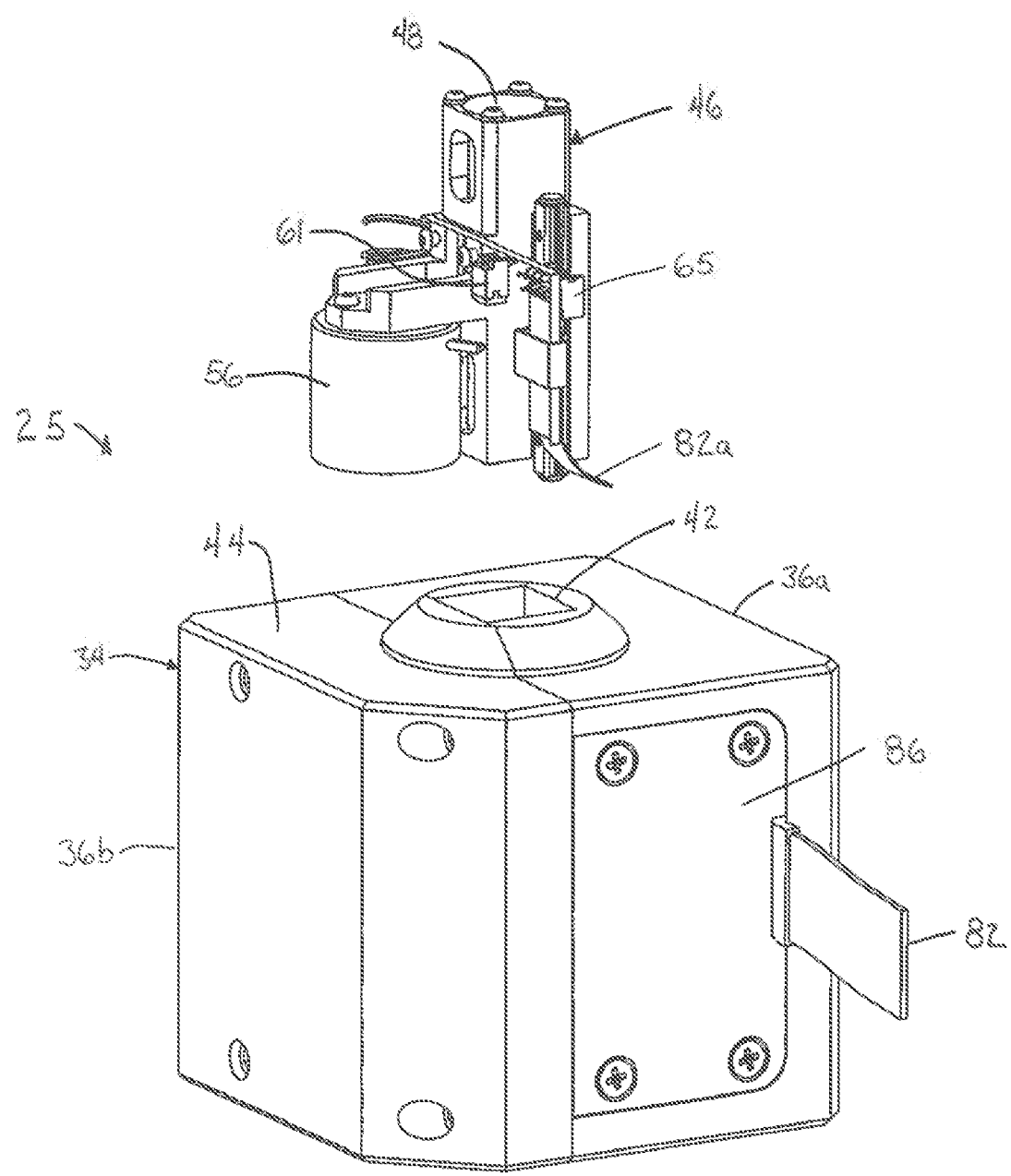
FIG. 4 is a perspective view of the focus lens adjustment assembly of FIG. 2 from an alternative orientation relative to FIG. 2 and disclosing a carriage assembly removed from the focus lens adjustment assembly and illustrating its orientation within the housing.
Figure 5:
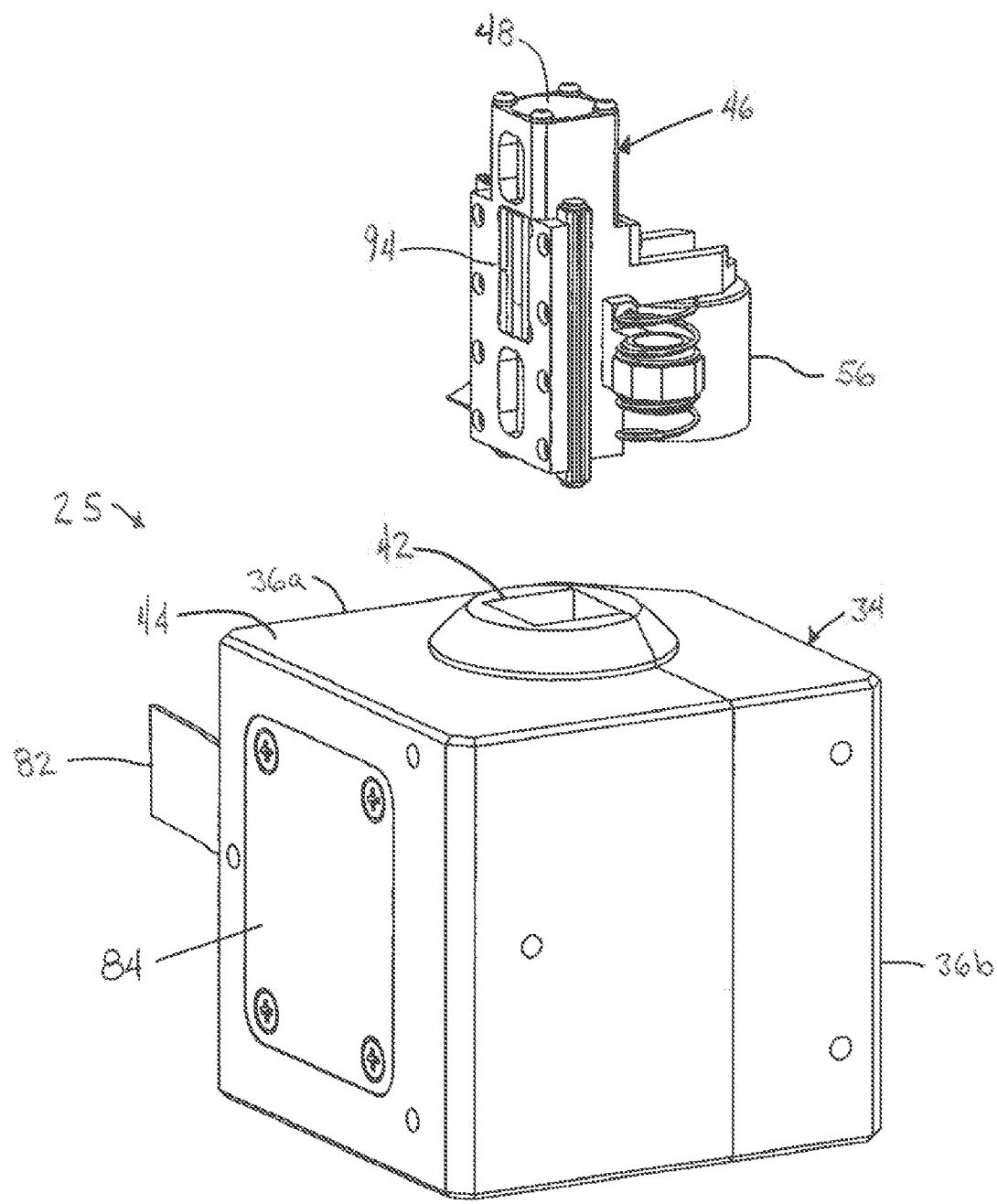
FIG. 5 is a perspective view of the focus lens adjustment assembly of FIG. 2 from an alternative orientation relative to FIG. 4 with the carriage assembly removed from the focus lens adjustment assembly and illustrating its orientation within the housing.

Housing portion 36b includes an internal cavity 50 within which is mounted a cylindrical magnet 52 having a cylindrical cavity receptacle 54, where magnet 52 is a voice coil core for a coil 56 on carriage assembly 46, as discussed below. Magnet 52 is secured to body portion 36b, such as to an internal surface 57 of body portion 36b, where by magnet 52 remains stationary within body 34. FIGS. 3 and 6A disclose magnet 52 apart from body portion 36b and relative to body portion 36a, as well as disclose fasteners 53 used to mount magnet 52 to body portion 36b. Body portion 36b additionally includes an internal opening 58 for cavity 50. In the illustrated embodiment of the adjustment assembly 25, as discussed in more detail below, wires 63 (FIG. 3) connected with coil 56 are interfaced with a ribbon cable 82 via the carriage assembly 46 where the ribbon cable 82 then extends to controller 29. In particular, wires 63 are joined with a connector 61 located on a bracket 63 of carriage assembly 46. Connector 61 is in turn interfaced so as to be plugged into a first PCA or travel PCA 65 mounted to bracket 63 with the travel PCA 65 thereby being moveable with carriage assembly 46. A flat flexible cable 82a is connected at one end to travel PCA 65 and at the opposite end to a printed circuit board configured as a second PCA or stationary PCA 76, with cable 82A forming a U-shaped loop to accommodate movement of the travel PCA 65. The stationary PCA 76 is thus used for controlling current signals to coil 56 for controlling movement of carriage assembly 46. In alternative embodiments, one or both of the portions of the housing may include an external opening with a cover through which wires connected with the coil may be passed out of the housing, such as through a tube, or the like, that extends to controller 29.

As best understood from FIGS. 3 and 6A, a set of linear bearings 66a, 66b are mounted within housing 34, and in particular are supported on first portion 36a of housing 34 when assembled. Linear bearings 66a, 66b are used to support carriage assembly 46 for movement within housing 34. Housing portion 36a further includes an external encoder opening 68 and an external side opening 70. Body portion 36a also includes an elongate spring cavity 67 having a central portion 69 and opposed spring cavity portions 71, 73. Adjustment assembly 25 further includes two springs 75, 77, with spring 75 disposed within cavity portion 71 and spring 77 disposed within cavity portion 73. An arm 79 of carriage assembly extends into central portion 69 and provides opposed spring mounting surfaces for one of the ends of each of springs 75, 79. The opposite end of spring 75 seats against the upper end of cavity portion 71, and a spring seat 83 is mounted to housing portion 36a to provide a seat for the opposite end of spring 77. As discussed in more detail below, springs 75, 77 operate to maintain carriage assembly 46 in a known orientation at startup. It should be appreciated that springs 75, 77 are each partially shown in the various views for ease of illustration of their installation within cavity 67.

Figure 6:
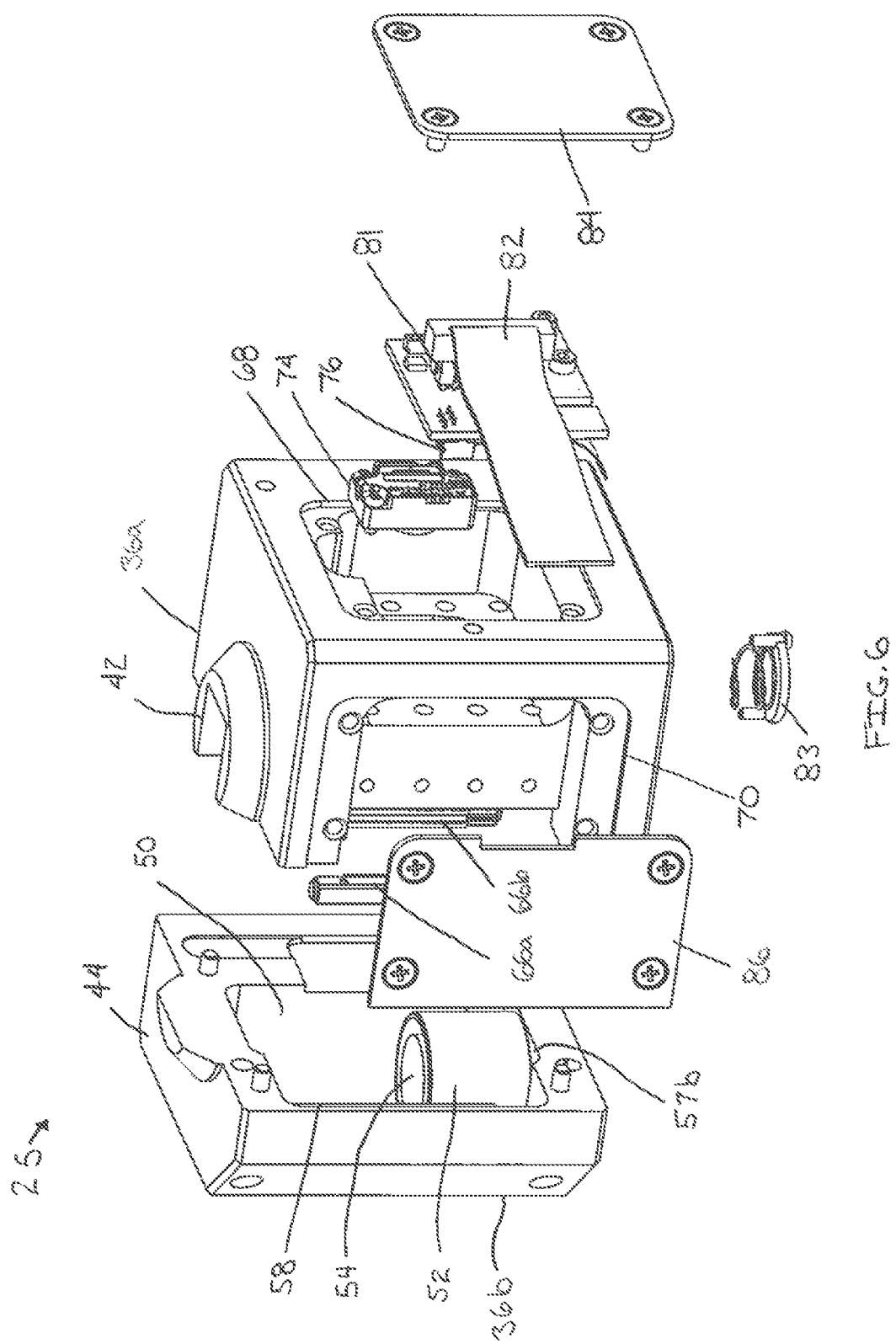
FIG. 6 is a partial exploded perspective view of the focus lens adjustment assembly without the carriage assembly.
Figure 6A:
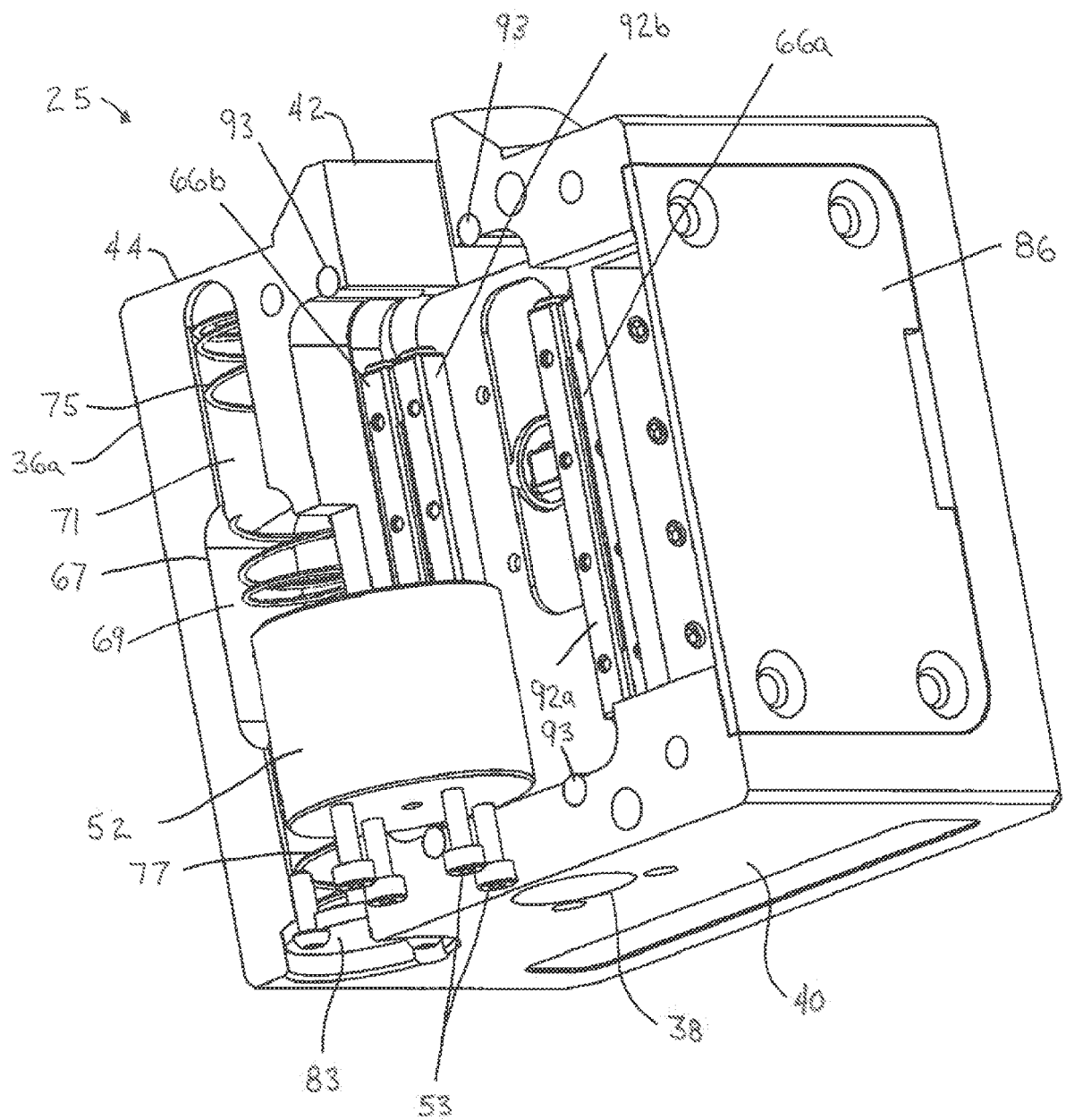
FIG. 6A is a partial perspective view of the focus lens adjustment assembly of FIG. 2 shown with a portion of the housing and the carriage assembly removed to disclose internal structure of the assembly.
Figure 7:
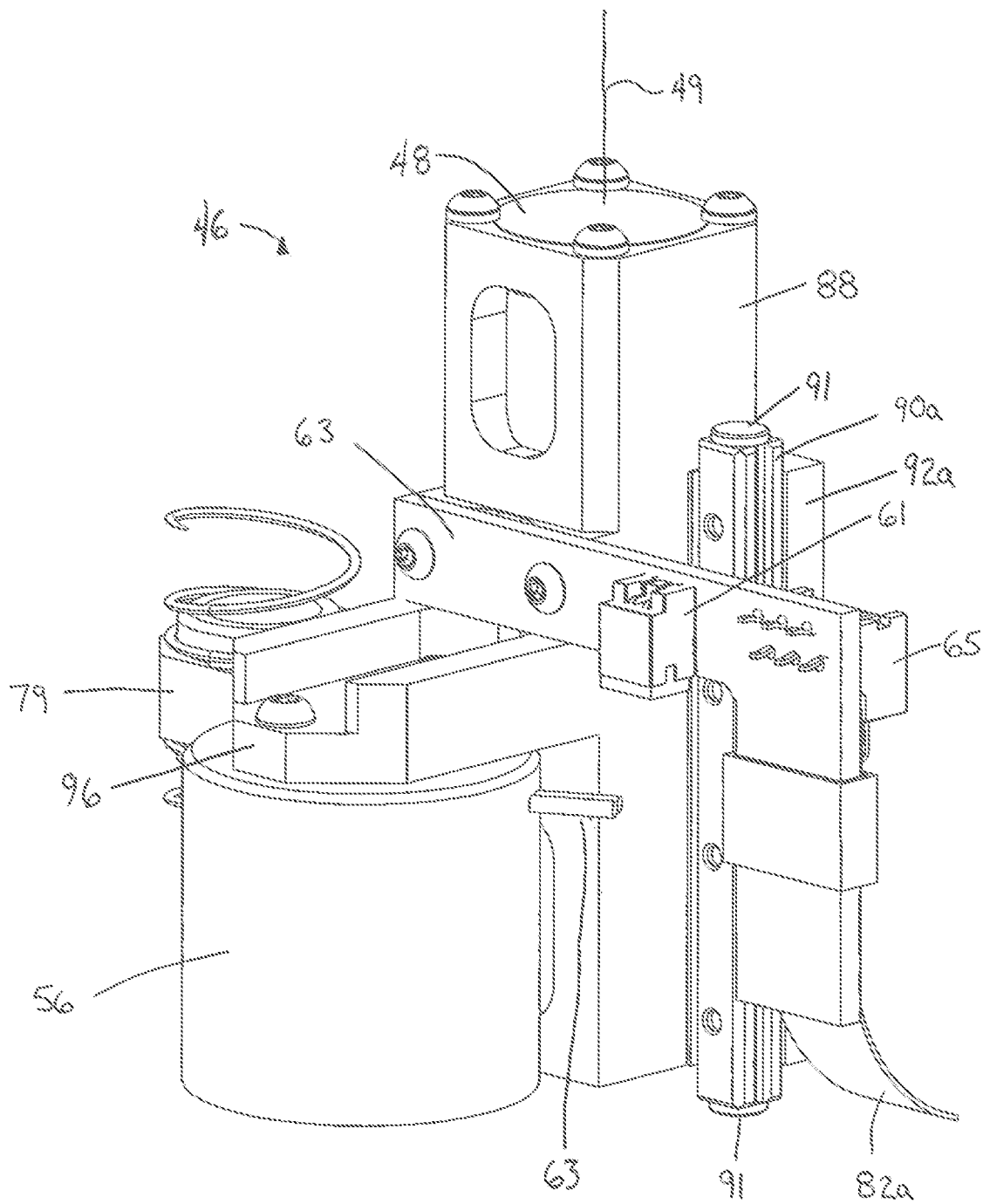
FIG. 7 is a close-up perspective view of the carriage assembly shown in FIGS. 4 and 5.

With further reference to FIG. 6, in the illustrated embodiment focus lens adjustment assembly 25 additionally includes a position sensor configured as an encoder read head 74 that is interfaced with the stationary PCA 76, which additionally operates as an interpolation encoder for movement of carriage assembly 46, with the encoder read head 74 and stationary PCA 76 being disposed within body portion 36a proximate encoder opening 68 and are used for monitoring/controlling the position of carriage assembly 46, as discussed below. Assembly 25 further includes a cable 82 configured as a ribbon cable for monitoring/controlling movement of the carriage assembly 46, with a ribbon cable connector 81 for connecting cable 82 with the stationary PCA 76. Cable 82 in turn is connected to controller 29 (FIG. 1) of the additive manufacturing system 20. An encoder cover 84 is selectively affixed to body portion 36a at opening 68 when assembled, and a side cover 86 is disposed over side openings 70, 72 when assembled, with side cover 86 including an opening to allow ribbon cable 82 to pass out of side cover 86.

Carriage assembly 46 will now be discussed in more detail with reference to FIGS. 3-5, 7 and 8. As previously noted, carriage assembly 46 includes focus lens 48, where lens 48 is mounted to an elongate carriage housing or body 88 so as to be supported by body 88, with body 88 including an opening 87 for an internal passageway 89. In operation, laser beam 30 enters carriage housing 88 from the end opposite focus lens 48, with the laser beam 30 passing through the internal passageway 89 of body 88 to impinge upon focus lens 48, and pass through focus lens 48 and out of exit aperture 42 of focus lens adjustment assembly 25.

A set of linear bearings 90a, 90b are mounted externally to carriage body 88, and in particular are mounted to flanges 92a, 92b. In the illustrated embodiment linear bearings 90a, 90b are configured as inside ways that mount for sliding movement to bearings 66a, 66b, respectively, where bearings 66a, 66b are configured as outside ways and rollers. Linear bearings 66a, 66b and 90a, 90b thus enable carriage assembly 46 to be moved linearly within body 34. Integral roller end stops 91 are disposed at both ends of each of the linear bearings 90a, 90b, where stops 91 are aligned with and contact compressible stops 93 mounted to body portion 36a adjacent the entry aperture 38 and exit aperture 42. In the illustrated embodiment stops 93 are configured as elastomeric members that limit the overall movement of carriage assembly 46 within body 34, in particular to protect for undesired movement outside of a particular range, as well provide cushioning for carriage assembly 46.

Figure 8:
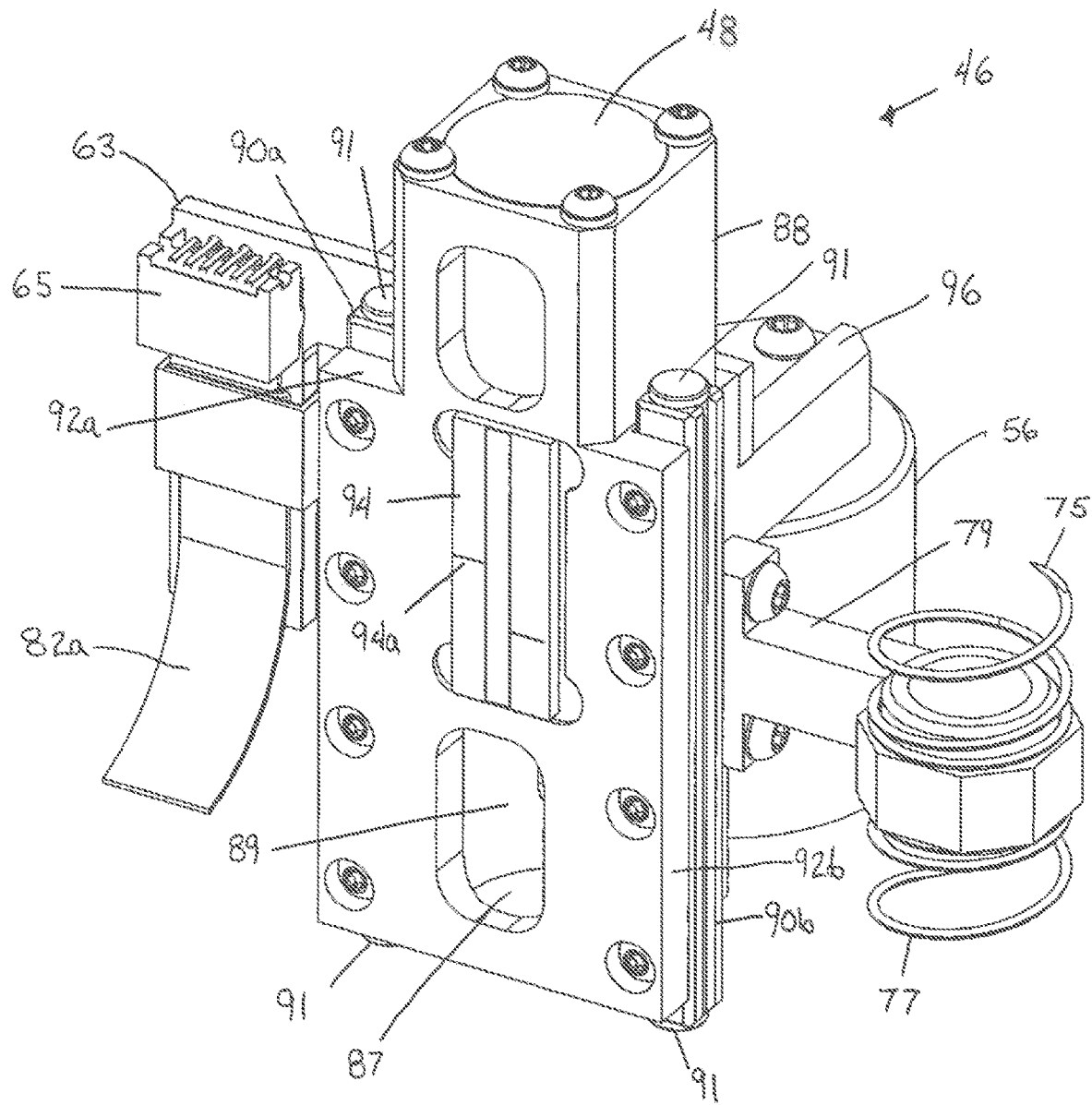
FIG. 8 is a close-up perspective view of the carriage assembly shown in FIGS. 4 and 5 from an alternative orientation relative to that shown in FIG. 7.

Carriage assembly 46 further includes a linear encoder scale 94 on carriage body 88 (see FIG. 8). Linear encoder scale 94 includes index mark 94a that is offset from the center of travel by 2.5 mm in the illustrated embodiment, where in the illustrated embodiment the carriage assembly 46 has approximately 10 mm of travel. Springs 75, 77 discussed above return carriage assembly 46 to approximately the center of travel when adjustment assembly 25 is powered down. Upon powering adjustment assembly 25 back up, the controller 29 thus knows which direction from center to travel to find the index. The controller 29 has programmably stored the forward and reverse travel limits with respect to the index scale and thus knows how far to command the carriage to travel relative to that point.

Still further, an arm 96 extends from carriage body 88 on an opposite side relative to encoder scale 94, where arm 96 in the illustrated embodiment perpendicularly extends relative to the travel direction of body 88 and is configured as a coil mount for mounting coil 56 thereto.

When carriage assembly 46 is assembled within body 34, coil 56 is positioned within receptacle 54 of magnet 52 and linear bearings 90a, 90b of carriage housing 88 are connected with linear bearings 66a, 66b that are mounted to body portion 36a. It should be appreciated that coil 56 comprises a winding of wires through which an electrical current is passed to operate as a voice coil motor with magnet 52, with the voice coil motor having a longitudinal axis defined by the up and down movement of coil 56 within magnet 52. That is, in the illustrated embodiment the longitudinal motor axis is coincident with the longitudinal axis of the cylindrical cavity 54 of magnet 52 and the longitudinal axis of the cylindrical coil 56. When assembled, linear encoder scale 94 is disposed adjacent encoder read head 74 and the optical axis 49 of focus lens 48 is offset from the longitudinal axis of the magnet 52 and coil 56. In particular, the focus lens 48 is aligned with the entry aperture 38 and exit aperture 42 of housing 34, and the longitudinal motor axis is offset from the axis defined by the entry aperture 38 and exit aperture 42. In the illustrated embodiment the longitudinal motor axis is parallel with the optical axis 49 of focus lens 48 within the bounds of manufacturing tolerances.

Operation of focus lens adjustment assembly 25 is controlled in a closed loop manner by way of the controller 29 for system 20. Current is selectively supplied to coil 56 via wires 63 for energizing coil 56, with controller 29 monitoring the position of carriage assembly 46 by way of signals from encoder read head 74 transmitted by cable 82 based on the position with respect to encoder scale 94.

Focus lens adjustment assembly 24 of FIG. 1 is constructed and operates in accordance with the assembly 24 disclosed in U.S. provisional patent application sr. no. 62/854,348, which is incorporated herein by reference in its entirety, and thus discloses that such an assembly may be alternatively constructed relative to focus lens adjustment assembly 25. Accordingly, various changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A lens positional adjustment assembly comprising:
   a lens;
   a moveable lens body, said lens being mounted to said lens body with a bearing member mounted to said lens body, said lens body including a passageway configured to enable a laser beam to be projectable at and through said lens;
   a first voice coil member of a voice coil motor mounted to said lens body, said first voice coil member being axially offset from said passageway of said lens body;
   a housing, said housing including a second voice coil member of a voice coil motor and including a housing bearing with said bearing member of said lens body being engaged with said housing bearing;
   wherein one of said first voice coil member and said second voice coil member comprises an electrical coil winding and the other comprises a magnet, and wherein said first voice coil member engages with said second voice coil member for movement of said lens body relative to said housing when a current is supplied to said electrical coil winding whereby movement of said lens body relative to said housing adjusts the position of said lens.

2. The assembly of claim 1, wherein said bearing member of said lens body and said housing bearing comprise linear bearings extending axially relative to the direction of movement of said lens body.

3. The assembly of claim 1, wherein an additional bearing member is mounted to said lens body and said housing includes an additional housing bearing, and wherein each of said bearing members are engaged with separate ones of said housing bearings, and wherein said bearing members and said housing bearings extend axially relative to the direction of movement of said lens body.

4. The assembly of claim 1, wherein an encoder scale is disposed at said lens body, and wherein an encoder reader is disposed at said housing for detecting movement of said lens body via said encoder scale.

5. The assembly of claim 1, wherein said magnet comprises a cylindrical magnet having a cylindrical cavity within which said electrical coil winding is engaged.

6. The assembly of claim 1, wherein said first voice coil member comprises said electrical coil winding, and wherein said second voice coil member comprises said magnet.

7. The assembly of claim 1, wherein said housing includes an entrance aperture and an exit aperture with said lens being aligned with said entrance aperture and said exit aperture and said lens body configured for movement between said entrance aperture and said exit aperture.

8. An additive manufacturing system including a lens positional adjustment assembly according to claim 1, wherein said additive manufacturing system comprises:
   a laser, said laser configured to project a laser beam at said lens positional adjustment assembly with said laser beam being projected at and through said lens;
   a pair of galvanometers, each said galvanometer including a mirror with said mirrors of said galvanometers configured to receive said laser beam upon said laser beam passing through said lens;
   a work surface, wherein said galvanometers and said lens positional adjustment assembly are operable to direct the laser beam from said laser at said work surface.

9. A lens positional adjustment assembly comprising:
   a lens;
   a moveable lens body, said lens being supported by said lens body to enable an energy beam to be projectable at and through an optical axis of said lens;
   a first voice coil member of a voice coil motor mounted to said lens body, said voice coil motor having a longitudinal motor axis defined by the movement of said voice coil motor with said longitudinal motor axis being axially offset from said optical axis of said lens;
   a stationary support member supporting a second voice coil member of a voice coil motor with said lens body being supported for movement relative to said support member;
   wherein one of said first voice coil member and said second voice coil member comprises an electrical coil winding and the other comprises a magnet, and wherein said first voice coil member engages with said second voice coil member for movement of said lens body relative to said support member when a current is supplied to said electrical coil winding whereby movement of said lens body relative to said support member adjusts the position of said lens.

10. The assembly of claim 9, further including a bearing member mounted to said lens body and wherein said support member includes a support bearing with said bearing member of said lens body being engaged with said support bearing.

11. The assembly of claim 10, wherein said bearing member of said lens body and said support bearing comprise linear bearings extending axially relative to the direction of movement of said lens body.

12. The assembly of claim 10, wherein an additional bearing member is mounted to said lens body and said support member includes an additional support bearing, and wherein each of said bearing members are engaged with separate ones of said support bearings, and wherein said bearing members and said housing bearings extend axially relative to the direction of movement of said lens body.

13. The assembly of claim 9, wherein an encoder scale is disposed at said lens body, and wherein an encoder reader is disposed at said support member for detecting movement of said lens body via said encoder scale.

14. The assembly of claim 9, wherein said magnet comprises a cylindrical magnet having a cylindrical cavity within which said electrical coil winding is engaged.

15. The assembly of claim 9, wherein said first voice coil member comprises said electrical coil winding, and wherein said second voice coil member comprises said magnet.

16. The assembly of claim 9, wherein said support member comprises a housing within which said lens body is disposed, and wherein said housing includes an entrance aperture and an exit aperture through which the energy beam is projected with said lens being aligned with said entrance aperture and said exit aperture and said lens body configured for movement between said entrance aperture and said exit aperture.

17. An additive manufacturing system including a lens positional adjustment assembly according to claim 9, wherein said additive manufacturing system comprises:
   a laser, said laser configured to project the beam of energy comprising a laser beam at said lens positional adjustment assembly with said laser beam being projected at and through said lens;
   a pair of moveable mirrors configured to receive said laser beam upon said laser beam passing through said lens;
   a work surface, wherein said moveable mirrors and said lens positional adjustment assembly are operable to direct the laser beam from said laser at said work surface.

18. A lens positional adjustment assembly comprising:
   a lens;
   a moveable lens body, said lens being supported by said lens body to enable a laser beam to be projectable at and through said lens;
   a first voice coil member of a voice coil motor mounted to said lens body, said voice coil motor having a longitudinal motor axis defined by the movement of said voice coil motor;
   a housing, said housing including a second voice coil member of a voice coil motor and including an entrance aperture and an exit aperture with said lens being aligned with said entrance aperture and said exit aperture and said lens being configured for movement between said entrance aperture and said exit aperture via said voice coil motor;
   wherein one of said first voice coil member and said second voice coil member comprises an electrical coil winding and the other comprises a magnet, and wherein said first voice coil member engages with said second voice coil member for movement of said lens body relative to said housing when a current is supplied to said electrical coil winding whereby movement of said lens body relative to said housing adjusts the position of said lens between said entrance aperture and said exit aperture, and wherein said longitudinal motor axis is offset from the axis defined by said entrance aperture and said exit aperture through which the laser beam is projected.

19. The assembly of claim 18, further including a position sensor within said housing for supplying positon information of said lens body to a controller for detecting the position of said lens body within said housing.

20. The assembly of claim 19, wherein said controller is further operable to control the current supplied to said electrical coil winding for controlling the position of said lens body.

* * * * *